Patented Mar. 16, 1943

2,313,732

UNITED STATES PATENT OFFICE 2,313,732

HALOGENATED PREGNANOLONES AND PREGNANDIONES

Adolf Butenandt, Danzig-Langfuhr, Free State of Danzig, assignor, by mesne assignments, to Schering Corporation, Bloomfield, N. J., a corporation of New Jersey No Drawing. Application August 3, 1935, Serial No. 34,599. In Germany August 4, 1934

4 Claims. (Cl. 260—397.3)

This invention relates to the manufacture of unsaturated hydroxy-ketones and diketones and of halogenated intermediates which can be converted into such ketones, and more particularly to compounds which have been named pregnenolines and pregnendiones.

The process of manufacture in accordance with this invention is carried out by converting the corresponding 3-hydroxy-bisnor-cholenic acids or their derivatives in the form of their esters into secondary-tertiary alcohols, splitting out water between the tertiary hydroxyl group and the adjacent tertiary hydrogen atom and splitting up the double bond thus produced in the side chain of the molecule, with suitable oxidizing agents with the formation of the corresponding hydroxy ketones or their derivatives.

Thus, by treatment of the 3-hydroxy-bisnorcholenic acids, in which if desired the nuclear double bond is protected by saturation with halogen whereby it is advantageous to protect the alcoholic hydroxy group by acylation or in any other manner, in the form of their esters with organo-metallic compounds, such as Grignard reagents, the corresponding unsaturated secondary-tertiary dialcohols are obtained. By splitting water out of these compounds from the tertiary hydroxyl group and the adjacent hydrogen atom alcohols are produced which are unsaturated in the side chain. If it has not previously been effected, the nuclear double bond is now saturated by treatment with halogen advantageously with previous protection of the hydroxy group as described above. Ozonization of the dihalogen acyl compounds produced with subsequent splitting off of halogen and saponification leads to the production of the desired unsaturated hydroxy ketones. These are distinguished from the corresponding pregnanolones merely by the presence of a nuclear double bond.

These unsaturated hydroxy ketones, the pregnenolones, according to a further object of this invention, are transformed by oxidation into unsaturated diketones, the so-called pregnendiones.

Thus, the unsaturated hydroxy ketone $C_{21}H_{32}O_2$ passes on treatment with various oxidising agents into a mixture of substances of formula $C_{21}H_{30}O_2$ which on testing for corpus luteum action possesses a high physiological activity. The oxidation can either be carried out in such a manner that the unsaturated hydroxy ketone itself is treated with oxidising agents which do not attack the double bond or by first protecting the double bond, for example by adding on bromine, subsequently oxidising to the ketone and debrominating the intermediate product produced.

The reaction mechanism may be illustrated by the following formulas:

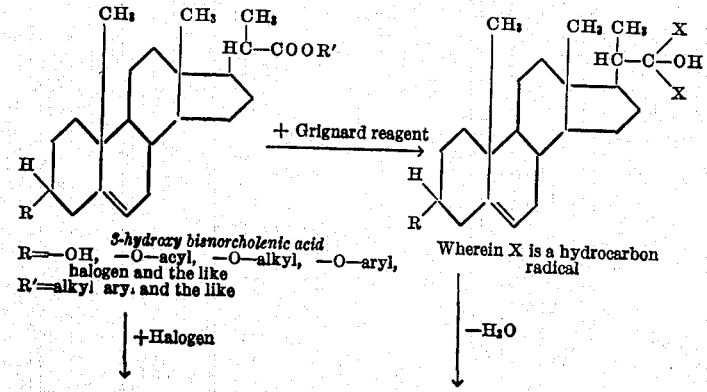

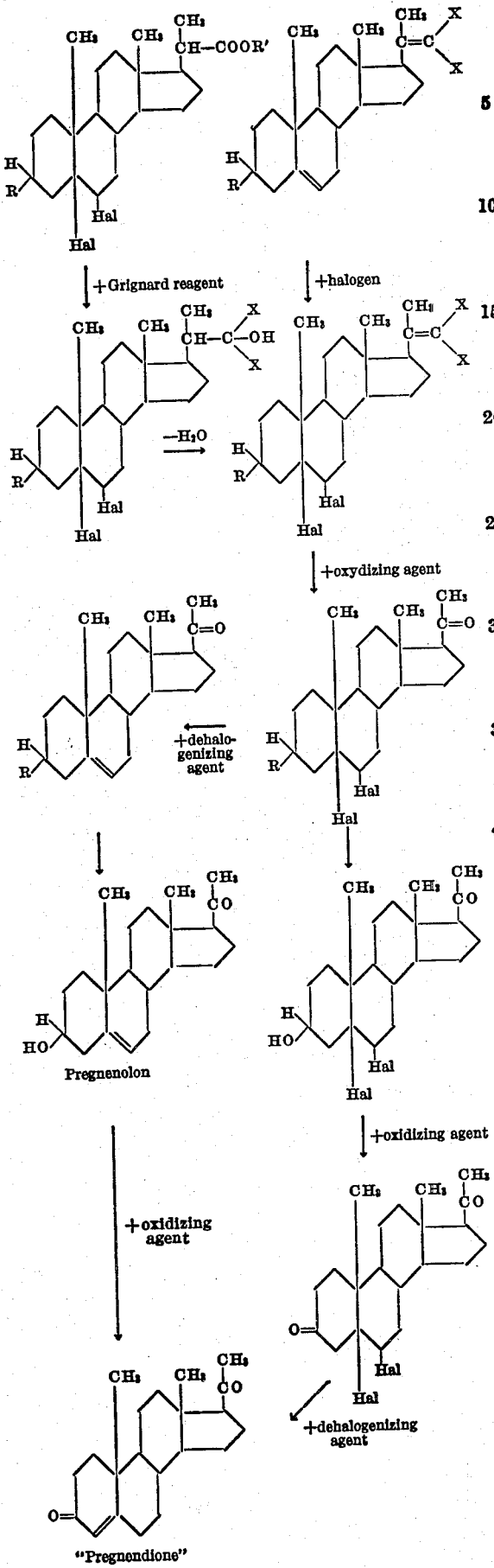

"Pregnendione"

The following examples serve to illustrate the invention, without, however, limiting the same to them:

*Example 1*

From stigmasterol according to Fernholz (Annalen 507, 128, 1933) the acetoxybisnorcholenic acid is produced and is saponified by boiling with 5% methyl alcoholic caustic potash lye to the free 3-hydroxybisnorcholenic acid (M. P. 295° C.). From this by reaction with diazomethane in methyl alcoholic-ethereal solution the methyl ester of M. P. 140° C. is obtained. 2.4 grams of hydroxybisnorcholenic acid methyl ester in 150 ccs. of absolute ether are added with stirring to a solution of 3.9 grams Mg and 25.2 grams of bromobenzene in 150 ccs. of absolute ether. The reaction mixture is heated for three hours under a reflux condenser, the ether distilled off and the residue heated for eight hours on the water bath, then decomposition is effected with ice and the whole acidified with dilute sulphuric acid and exhaustively extracted with ether. After distilling off the ether the reaction product is distilled with steam, and finally the unreacted ester contained therein saponified by boiling with methyl alcoholic potash. The saponification solution is acidified, again distilled with steam and the residue taken up in ether and freed from the acid constituents by extraction by shaking with dilute caustic soda lye. The ethereal solution is then evaporated and treated with double the volume of glacial acetic acid, boiled for several hours under a reflux condenser, the glacial acetic acid distilled off and the residue distilled in a high vacuum. The major portion passes over at 270-280° C. under 0.001 mm. pressure, as a yellowish oil which soon solidifies. Yield 1.2 gms. By heating with 5 gms. of acetic anhydride an acetate is obtained therefrom of M. P. 216-217° C.

0.4 gm. of the acetate is dissolved in 20 ccs. of chloroform and treated with ice cooling drop by drop with 0.125 gms. of bromine (=2 atoms per molecule) in 5 ccs. of chloroform. Into this solution which now contains the dibromide of the acetate a stream of ozonized oxygen yielding about 6 mg. of ozone per minute is introduced for 1 hour with ice cooling. After removal of the chloroform the residue is treated for debromination with 1 gm. of zinc dust and 20 ccs. of glacial acetic acid and heated for 1 hour on the water bath. The glacial acetic acid solution is thereupon filtered, diluted with water and extracted with ether. The ether extract is washed with caustic soda lye, decolorized with animal charcoal and evaporated. In this manner the acetate of the hydroxy-ketone $C_{21}H_{32}O_2$ is obtained as an oily crystal mass which after recrystallisation from dilute alcohol exhibits the melting point 146-147° C.

By interaction with semicarbazide-acetate the semicarbazone results of M. P. 263° C. and by splitting of the latter the free hydroxy-ketone $C_{21}H_{32}O_2$ of M. P. 190° C. Yield about 0.15 gm. The same hydroxyketone is obtained by direct saponification of the acetate.

Instead of using 3-acetoxy bisnorcholenic acid as starting material, also other derivatives of said acid may be used, especially those wherein the hydroxy group is protected by esterification or etherification or by substitution by halogen, that is, in a manner which permits subsequent restoration of the hydroxy group.

The oxidation of the hydroxy ketones $C_{21}H_{32}O_2$ obtained according to the above mentioned Example 1 or by other methods, to the corresponding diketone $C_{21}H_{30}O_2$, pregnendione, is carried out in the following manner:

I. DIRECT OXIDATION OF THE UNSATURATED HYDROXY KETONE

Example 2.—Oxidation with chromic acid

A solution of hydroxyketone in pure glacial acetic acid is treated with a quantity of chromium trioxide corresponding to three atoms of available oxygen in glacial acetic acid. Care is taken that the temperature does not exceed 15° C. The mixture is allowed to stand for 1 to 2 days in an ice chest and then diluted with water and taken up with ether. From the ethereal solution the acid constituents are extracted by shaking with sodium carbonate; the remaining neutral constituents crystallise in white needles and exhibit a melting point of 120 to 135° C.

Instead of chromium trioxide Beckmann chromic acid mixture can be employed.

Example 3.—Oxidation with metal oxides

The oxidation can also be carried out in such a manner that the hydroxy ketone is fused in a wide-mouthed reagent glass at a bath temperature of 280–300° C. and 5 times the weight of finely powdered copper oxide introduced in 3–4 portions. After 1 hour the reaction product is repeatedly shaken with anhydrous methyl alcohol, the solution treated in the cold with animal charcoal and the solvent allowed to evaporate. The diketone mixture above described remains.

II. OXIDATION OF THE HYDROXY KETONE WITH PROTECTION OF THE DOUBLE BOND

The double bond can be most simply protected by allowing one molecular proportion of bromine to react on the hydroxy ketone in glacial acetic acid or chloroform solution. The dibromide produced can be converted into the diketone either by means of the above described oxidation reactions or there can be employed as oxidising agent $KMnO_4$ in dilute aqueous, acid solution. As reaction product there is produced in this case a brominated diketone which is debrominated by short heating with zinc dust in glacial acetic acid solution.

Example 4

For the production of the brominated hydroxy-ketone 70 mg. of the hydroxy-ketone are dissolved in 10 ccs. of glacial acetic acid and treated drop by drop with a solution of 25.3 mg. of bromine in 3 ccs. of glacial acetic acid. Rapid decolourisation of the bromine takes place. The dibromide can be isolated by means of chloroform and is obtained after recrystallisation from dilute alcohol in colourless needles of M. P. 104° C.

Example 5

The brominated hydroxy ketone is dissolved in benzene and the benzene solution shaken with aqueous acid potassium permanganate solution sufficient to provide three molecules of oxygen. The working up takes place as in Example 6.

Example 6

To the bromination solution obtained according to Example 1 is added in the cold drop by drop a quantity of chromium trioxide corresponding to 5 atoms of available oxygen in 13 ccs. of glacial acetic acid. After standing for 20 hours at 20° C. the reaction solution is poured into water and extracted with ether. After evaporation of the ethereal solution there remains a colourless oil which is heated for 10 minutes on the water bath with 2 ccs. of glacial acetic acid and about 1 gram of zinc dust. The reaction product is precipitated with water, taken up in ether and sublimed in a high vacuum (130° C., $10^{-3}$ mm.). The crude crystallisate exhibits all the properties of the corpus luteum-hormone obtained from natural sources or from pregnandiol, and on mixing therewith gives no depression of the melting point.

The organo-metallic compounds employed herein are those which, like the Grignard reagents, are utilized in organic synthesis for the conversion, for example, of acid and ketone groups to alcohol groups, and where in the claims I refer to "an organo-metallic compound of the Grignard type," I include both the Grignard compounds and their known equivalents.

Of course, various modifications and changes in the reaction conditions etc. may be made by these skilled in the art in accordance with the principles set forth herein and in the claims annexed hereto.

What I claim is:

1. A pregnenol-3-one-20 which has been saturated by halogenation.
2. 5,6-dibromo-pregnanol-3-one-20.
3. 5,6-dibromo-pregnandione-3,20.
4. A compound of the general formula

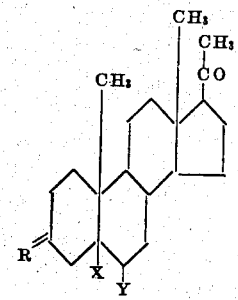

in which R is a member of the class consisting of =O,

and groups convertible with the aid of hydrolysis into the latter, and X and Y represent halogen.

ADOLF BUTENANDT.